D. A. GILCHRIST.
ROCK GATHERING AND EXCAVATING MACHINE.
APPLICATION FILED JULY 7, 1909.

1,029,359.

Patented June 11, 1912.

4 SHEETS—SHEET 1.

FIG. I.

WITNESSES

INVENTOR
David A. Gilchrist
BY
ATTORNEYS

D. A. GILCHRIST.
ROCK GATHERING AND EXCAVATING MACHINE.
APPLICATION FILED JULY 7, 1909.

1,029,359.

Patented June 11, 1912.
4 SHEETS—SHEET 2.

WITNESSES

INVENTOR
David A. Gilchrist
BY
ATTORNEYS

D. A. GILCHRIST.
ROCK GATHERING AND EXCAVATING MACHINE.
APPLICATION FILED JULY 7, 1909.

1,029,359.

Patented June 11, 1912.
4 SHEETS—SHEET 3.

WITNESSES

INVENTOR
David A. Gilchrist
BY
Munn & Co
ATTORNEYS

D. A. GILCHRIST.
ROCK GATHERING AND EXCAVATING MACHINE.
APPLICATION FILED JULY 7, 1909.
1,029,359.
Patented June 11, 1912.
4 SHEETS—SHEET 4.
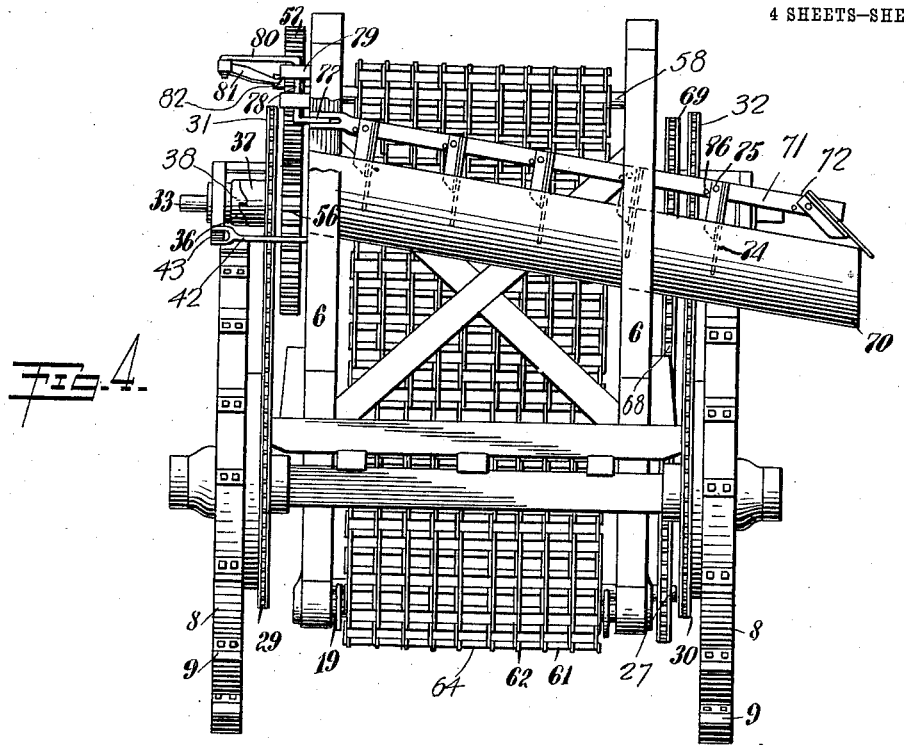
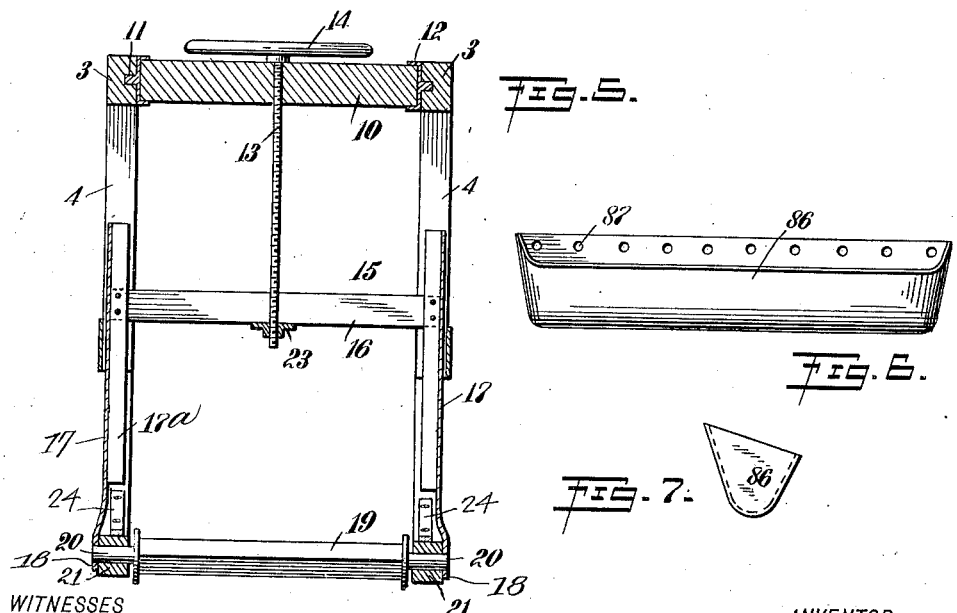
WITNESSES
INVENTOR
David A. Gilchrist
BY
ATTORNEYS

UNITED STATES PATENT OFFICE.

DAVID A. GILCHRIST, OF BELGRADE, MONTANA.

ROCK-GATHERING AND EXCAVATING MACHINE.

1,029,359.   Specification of Letters Patent.   Patented June 11, 1912.

Application filed July 7, 1909. Serial No. 506,304.

*To all whom it may concern:*

Be it known that I, DAVID A. GILCHRIST, a citizen of the United States, and a resident of Belgrade, in the county of Gallatin and State of Montana, have invented a new and Improved Rock-Gathering and Excavating Machine, of which the following is a full, clear, and exact description.

This invention relates to a machine which is adapted to be used for gathering rocks and boulders from land which is to be used for agricultural purposes.

The invention is also adapted to be used as an excavator.

The object of the invention is to provide a machine of this kind to which draft animals may be attached, and which is constructed in such a way that it can be operated automatically when advanced by the horses to pick up rocks lying on or near the surface of the earth. A special arrangement is made for adjusting the device to this work, and special scoop attachments are provided which may be employed so as to transform the machine into an excavator.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1:
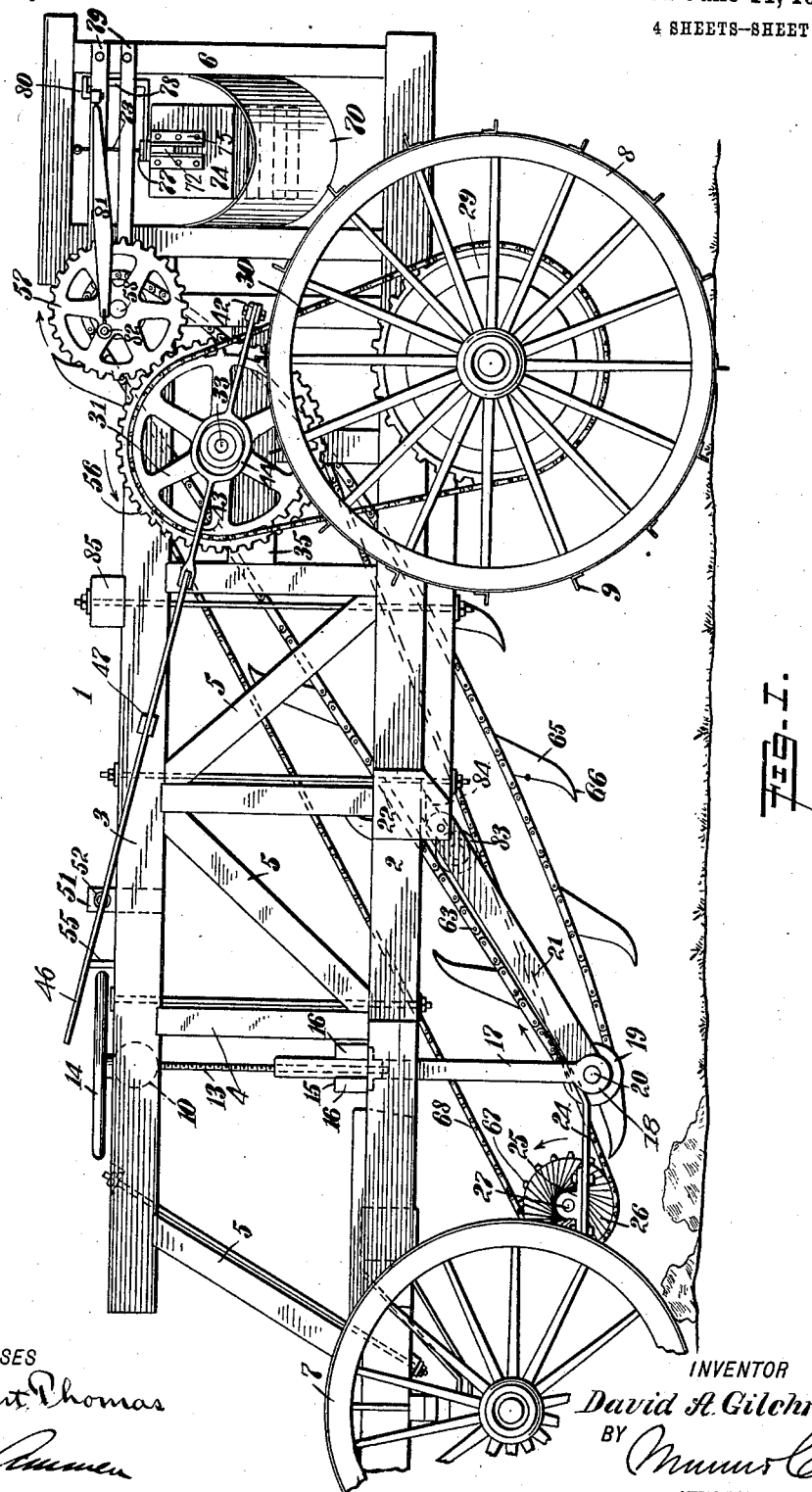
Figure 2:
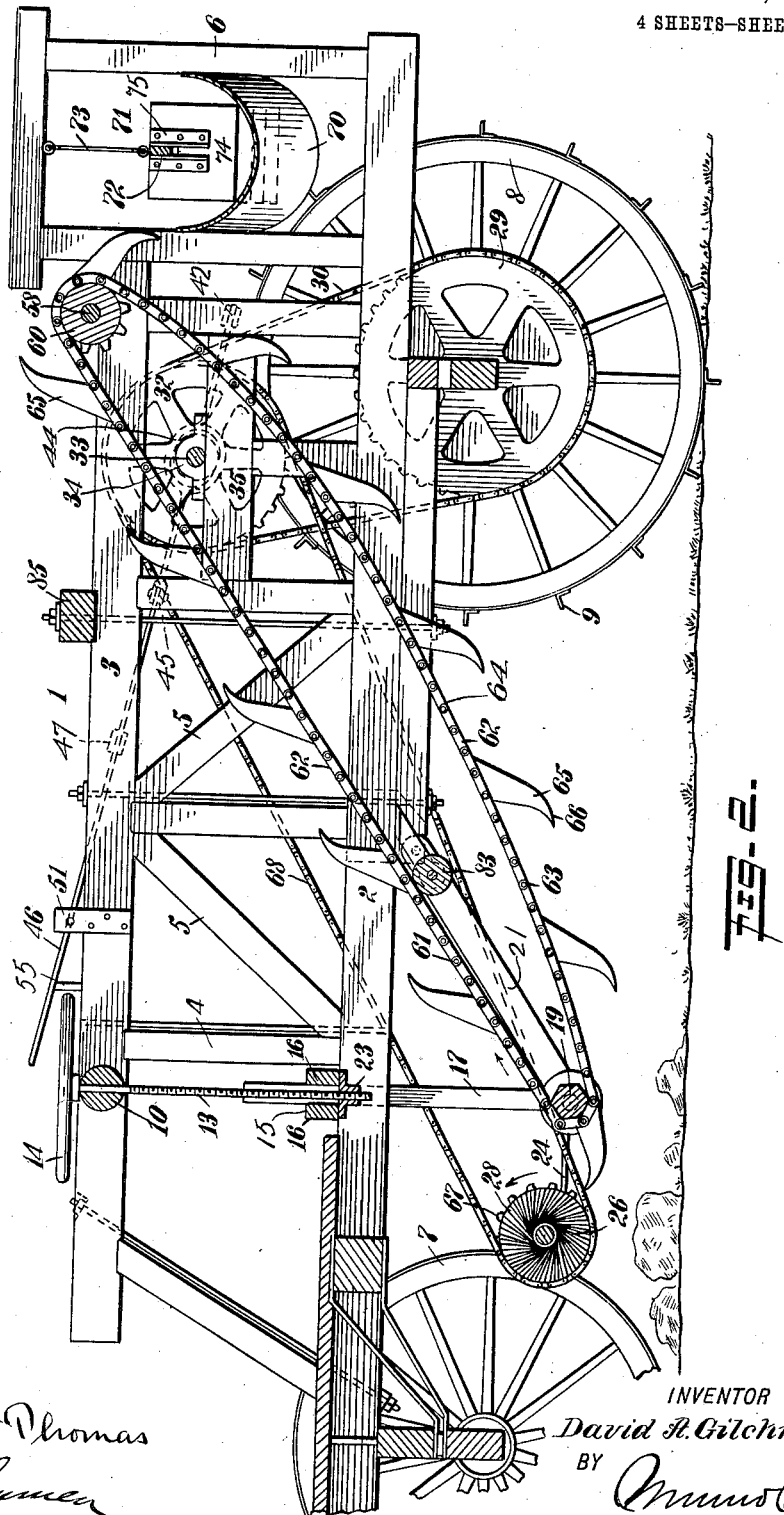
Figure 3:
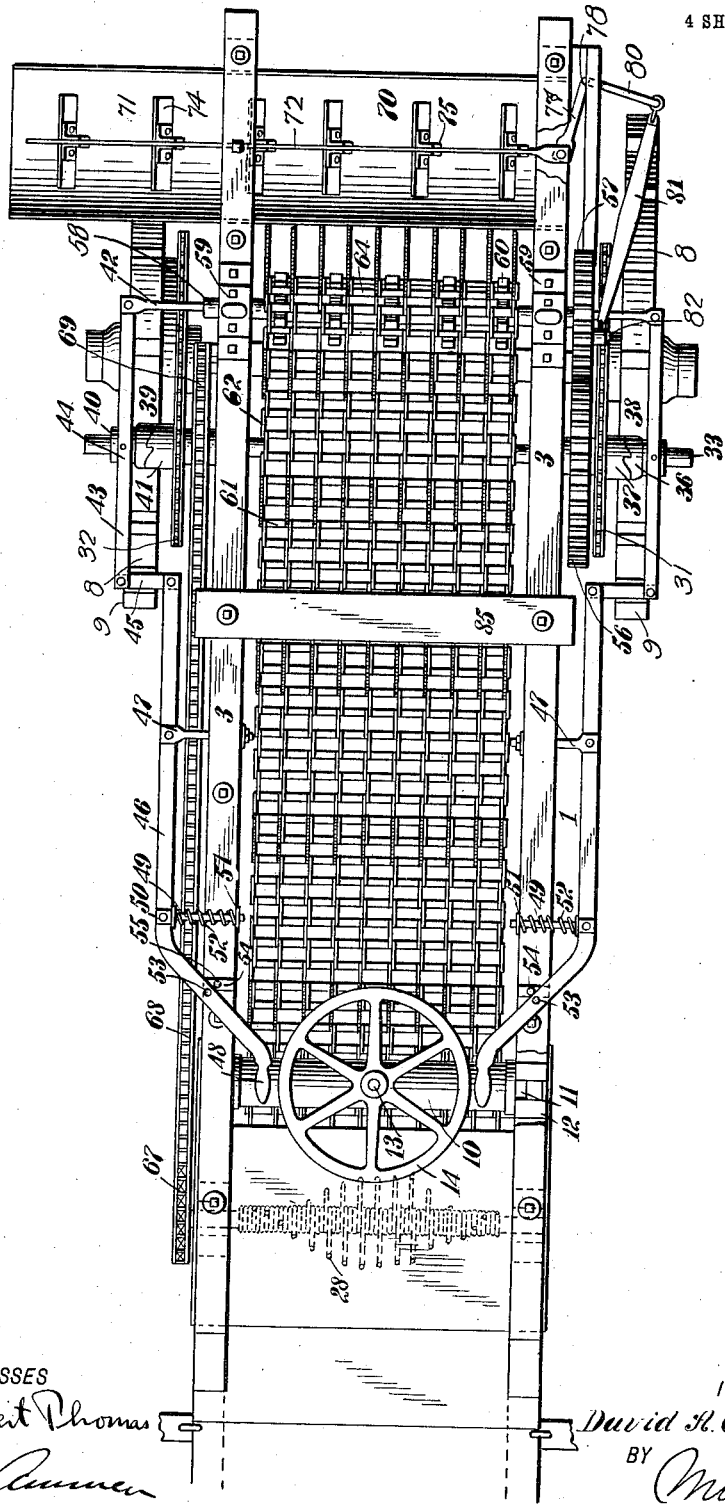

Figure 1 is a side elevation of a machine constructed according to my invention, certain parts being broken away; Fig. 2 is a longitudinal central section taken through the machine, certain parts being broken away; Fig. 3 is a plan of the machine, certain parts being broken away; Fig. 4 is a rear elevation of the machine; Fig. 5 is a vertical cross section through the machine taken at the point where the rocks are raised from the earth, and particularly illustrating the adjusting mechanism; Fig. 6 is a front elevation of a scoop, a plurality of which may be attached to the conveyer of the machine so as to transform it into an excavator; and Fig. 7 is an end elevation of the scoop shown in Fig. 6.

Referring more particularly to the parts, 1 represents the frame of the machine, which comprises lower side beams 2 and upper side beams 3, said beams at each side being connected by posts 4, and inclined studs or braces 5, as indicated. At the rear end of the frame 1, a chute frame 6 is mounted which projects slightly above the main frame 1, as indicated. The frame 1 is mounted upon four wheels including two forward wheels 7, and two large rear wheels 8. These rear wheels are provided with cleats or dugs 9, on their faces which dig into the earth and give the machine good tractive power.

In the forward part of the frame 1, and between the upper side beams 3, a swivel bar 10 is mounted, the ends of the said bar being provided with gudgeons 11 which are rotatably mounted in the inner faces of the side beams 3, as shown most clearly in Fig. 5. These gudgeons 11 are formed integrally with caps 12 which are attached on the face of the swivel bar, as shown. At the middle point of this swivel bar 10, an adjusting screw 13 is mounted, said screw passing diametrically through the bar from the upper side, and being provided on its upper end with a hand wheel 14 for rotating the screw. The lower end of this screw 13 passes through a central slot formed in a cross head 15, said cross head being formed of two oppositely disposed sections 16. The ends of these sections 16 are attached rigidly to arms 17 which extend vertically downward, as shown. The said arms as shown in Fig. 5 are substantially U-shaped in cross section and at the lower end of the arms the flanges 17ª are cutaway to avoid interference with the elevator. The lower ends of these arms 17 are offset outwardly and provided with bearings 18 for a guide roller 19 which is rotatably mounted between them, as shown. The roller 19 is provided with gudgeons 20 which are rotatably mounted in the bearings, and in the ends of the arms 17. On these gudgeons 20, links 21 are journaled, which extend upwardly and rearwardly in an inclined direction, as indicated in Fig. 1. The rear ends of these links 21 are attached pivotally to brackets 22 which are rigidly secured to the outer sides of the side beams 2. On the under side of the cross head 15 a nut 23 is provided which has a threaded engagement with the adjusting screw 13 so that when the hand wheel 14 is rotated the cross head 15 will be raised or lowered.

To the upper faces of the lower ends of the links 21, as indicated in Fig. 1, brush arms 24 are attached, which extend forwardly, as shown, and these brush arms near their forward extremities are provided with bearings 25 which support a rotatable brush 26. This brush has a central shaft 27 from which stiff resilient wires or rods 28 radiate. As indicated in Fig. 3, these rods are arranged progressively with respect to each other and with respect to their angular position on the shaft. They constitute teeth for assisting in raising the rocks from the earth. Those teeth which are located near the middle of the shaft are disposed most rearwardly with respect to the direction of rotation.

The wheels 8 are provided with rigid sprocket wheels 29, and over these sprocket wheels sprocket chains 30 run which are endless and which extend up around sprocket wheels 31 and 32 attached, respectively, at the left side and right side of the machine. These sprocket wheels 31 and 32 are loosely mounted on a main shaft 33 which extends transversely of the frame and is rotatably mounted in suitable bearings 34 supported on frame bars 35. On the shaft 33 at the left side of the machine, a sliding collar 36 is attached which is connected to the shaft so as to rotate it. The inner face of this collar is formed with teeth so that it constitutes a clutch member coöperating with a similarly formed clutch member 37. This clutch member 37 is formed on the hub of the sprocket wheel 31. The collar 36 and the clutch member 37 constitute a clutch 38, and when this clutch is thrown in, as indicated in Fig. 3, the motion of the chain 30 will impart a rotation to the main shaft. A similar clutch 39 is provided on the other side of the machine, comprising a sliding collar 40 constituting a clutch member and coöperating with another clutch member 41 which constitutes the hub of the sprocket wheel 32.

At the sides of the frame horizontal posts 42 are secured which project outwardly, as indicated, and to the ends of these posts clutch levers 43 are attached. These clutch levers have yokes 44 near their middle points which engage the collars 36 and 40 and slide the collars when the levers are operated. The ends of the levers 43 are connected by a link 45 with hand levers 46. These hand levers are pivotally mounted on posts 47 which project horizontally from the side of the frame, and the forward ends of the levers are inclined inwardly and provided with handles 48 for operating the levers. Near the forward ends of the levers, stems 49 are provided which are pivotally attached at 50 to the levers. The inner ends of these stems pass freely through guide plates 51 which are attached to the frame, as indicated. Between the guide plates 51 and the levers 46, coil springs 52 are provided which tend to hold the levers in a position which will retain the clutches closed. When the levers are forced inwardly the clutches will be opened, as will be readily understood. On the inclined extensions of the levers latch pins 53 are provided which can be applied in openings 54 in a latch plate 55 so as to hold the clutches open when desired.

On the shaft 33 there is provided a rigidly attached gear wheel 56, and this gear wheel meshes with a pinion 57 which is rigidly secured to a sprocket shaft 58. This sprocket shaft is mounted in a horizontal position on the frame in suitable bearings 59, as indicated. At intermediate points along its length it is provided with sprocket wheels 60 which are rigidly attached, and over these sprocket wheels runs a conveyer 61 which is in the form of a chain belt, presenting links 62 which are connected by transverse pins 63, passing through rollers 64, as shown. These rollers 64 engage the teeth of the sprocket wheels 60 so that when the shaft 58 rotates it will drive the chain. The chain is an endless chain and its lower end passes over the aforesaid guide roller 19. This guide roller is indicated in Fig. 2 as of polygonal cross section. In the illustration I have represented it as hexagonal in form, and the links 62 are of slightly greater length than the width of the side faces of the polygon so that the chain will fit nicely about the body of the roller, as indicated in Fig. 2. The chain or conveyer is provided with a plurality of teeth 65 which are large and project forwardly, forming pointed hooks 66 at their forward ends, as indicated. Each tooth is attached to one link only so that it does not interfere in any way with the passing of the chain about the roller 19.

In order to drive the brush 26, the brush shaft 27 is provided with a sprocket wheel 67 over which runs an endless sprocket chain 68. The rear portion of this chain 68 passes around a sprocket wheel 69 which is carried rigidly by the shaft 33.

At the rear end of the machine, and in the chute frame 6, a chute 70 is mounted. This chute is formed of a plate which is bent so as to form an inclined gutter, the end of which projects from the right side of the machine, as indicated on Fig. 3. In this chute an ejector 71 is mounted, said ejector comprising a longitudinally disposed bar 72 which is suspended on a link 73 which hangs from the frame. On this bar 72 a plurality of paddles or blades 74 are pivotally attached at 75. On the sides of the bar 72, stop pins 76 are provided which limit the rearward movements of these paddles, but which permit their forward movement, as indicated at the right in Fig. 4. This bar 72 is reciprocated while the machine is in operation, for which purpose its upper end is attached pivotally to an arm 77 which projects from a rock shaft 78 mounted in vertical bearings 79 on the side of the frame. This rock shaft has an arm 80 which projects outwardly and is connected by a link or pitman 81 with a pin 82 on the outer side face of the gear pinion 57. When the machine is in operation these paddles reciprocate longitudinally of the chute. On their rearward movement they permit the paddles to swing upwardly so as to move over the rocks, and on their forward movement they catch the rocks and move them toward the end of the chute. A vehicle of some kind will be driven along at the side of the machine so as to catch the rocks which fall from the chute.

In order to support the upper run of the conveyer, I provide a transversely supported roller 83 which is supported on brackets 84, as indicated in Fig. 2. This roller has a plain upper face which is rubbed against by the lower faces of the links as the chain passes upwardly. In order to give the sides of the frame rigidity, they are connected by a heavy cross bar 85, as indicated in Figs. 1 and 3.

In the operation of the machine, as it is advanced by the draft animals, the wheels 8 drive the shaft 33, which drives the conveyer belt, the brush, and also the ejector. The conveyer belt and the brush are driven in the direction of the arrows indicated in Fig. 1. By means of the hand wheel 14 the roller 19 is adjusted to the proper level so that as the teeth 65 advance they will pick up the rocks lying on the earth or near its surface. The brush 26 coöperates with the teeth so as to raise the rocks so that they will lie upon the conveyer belt. The conveyer belt then transports them up to its upper end where they are dumped into the chute and thrown out of the chute by the ejector. As the roller 19 is adjusted downwardly, of course the links 21 rotate about their pivot supports on the brackets 22, and the swivel bar 10 rotates slightly on its axis so as to accommodate the arms 17 and the adjusting screw to the new position of the links. When the machine is to be turned either one of the clutches may be thrown out. This would be necessary because the wheels would tend to drive the shaft 33 at different speeds so that one of the wheels would become locked.

Instead of employing teeth such as the teeth 65, I may provide a plurality of scoops such as the scoop 86 illustrated in Fig. 6. This scoop is provided at its inner edge with bolt openings 87 which enable it to be attached to oppositely disposed links of the chain conveyer. As the scoops pass under the roller 19 they will pick up the earth and dump it into the chute at their upper ends.

Having thus described my invention, I claim as new and desire to secure by Letters Patent,—

1. In a machine of the character specified, a frame, an endless conveyer supported by the frame, links pivoted by one end to the frame, a roller journaled in the free ends of the links and on which the front end of the conveyer is supported, arms extending forwardly from the links, a brush roller journaled between the arms, a cross head supporting the free ends of the links, and means for adjusting the cross head vertically, said means comprising a swivel bar substantially parallel with the cross head, a screw journaled in the swivel bar, and a nut on the cross head with which the screw engages.

2. In a machine of the character specified, a frame, an endless conveyer supported by the frame, links pivoted by one end to the frame, a roller journaled in the free ends of the links and on which the front end of the conveyer is supported, arms extending forwardly from the links, a brush roller journaled between the arms, a cross head supporting the free ends of the links, and means for adjusting the cross head vertically.

3. In a machine of the class described, in combination, a frame, a swivel bar mounted in said frame, an adjusting screw mounted in said bar, a cross head connected with said adjusting screw and adapted to be raised and lowered thereby, arms attached to said cross head and extending downwardly therefrom, a guide roller supported between said arms, links connecting the ends of said roller with said frame, a conveyer belt mounted in said frame in an inclined position and having its lower end guided around said guide roller, and means for driving said conveyer belt.

In testimony whereof I have signed my name to this specification in the presence of two subscribing witnesses.

DAVID A. GILCHRIST.

Witnesses:
 W. H. CLARK,
 CHAS. VANDERHOOK.

Copies of this patent may be obtained for five cents each, by addressing the "Commissioner of Patents, Washington, D. C."